United States Patent [19]
Bartlett

[11] Patent Number: 5,292,075
[45] Date of Patent: Mar. 8, 1994

[54] DISPOSABLE DIAPER RECYCLING PROCESS

[75] Inventor: Bruce L. Bartlett, Woodenville, Wash.

[73] Assignee: Knobbe, Martens, Olson & Bear, Newport Beach, Calif.

[21] Appl. No.: 890,940

[22] Filed: May 29, 1992

[51] Int. Cl.⁵ ............................................. B02C 23/18
[52] U.S. Cl. ........................................ 241/20; 241/24; 241/DIG. 38
[58] Field of Search .......... 241/14, 21, 79.1, DIG. 38, 241/24, 20

[56] References Cited

U.S. PATENT DOCUMENTS

| | | | |
|---|---|---|---|
| 3,814,240 | 6/1974 | Laundrie | 209/11 |
| 3,834,630 | 9/1974 | Nelson | 241/19 |
| 3,859,174 | 11/1975 | Taylor | 203/10 |
| 3,890,220 | 6/1975 | Anderson | 209/3 |
| 4,034,862 | 7/1977 | Bahri et al. | 209/11 |
| 4,303,501 | 12/1981 | Steffens | 209/2 |
| 4,305,507 | 12/1981 | Wittkopf | 209/3 |
| 4,332,677 | 6/1982 | Budzich et al. | 209/3 |
| 4,500,040 | 2/1985 | Steffens | 241/14 |
| 4,592,115 | 6/1986 | Holmstrom | 19/82 |
| 4,990,244 | 2/1991 | Anderson | 209/2 |
| 5,104,047 | 4/1992 | Simmons | 241/20 |

Primary Examiner—Mark Rosenbaum
Assistant Examiner—John M. Husar
Attorney, Agent, or Firm—Knobbe, Martens, Olson & Bear

[57] ABSTRACT

Due to ever-increasing waste production and ever-dwindling landfill space, alternatives to throwing away disposable diapers is needed. The present invention relates generally to a recycling process for reclaiming used paper and plastic materials. The process comprises a first step of shredding the used disposable diapers into small pieces, which facilitates the separation of the plastics from the pulp-like filler material. The shredded matter is then washed in a solution comprising water containing various ecologically-safe cleaning agents, as well as calcium chloride and salt to neutralize the acrelites in the pulp-like material. The shredded matter is then washed in a washer comprising a perforated cylindrical drum, which spins and forces the slurry through the perforations, while retaining the plastic material. The slurry-like material containing pulp is then dehydrated. The separate plastic and dehydrated pulp-like materials can then be sold for recycling.

31 Claims, 7 Drawing Sheets

DISPOSABLE DIAPER RECYCLING PROCESS

FIELD OF THE INVENTION

The present invention relates generally to a recycling process for reclaiming the paper and plastic matter contained in single-use human waste collecting and/or absorbing products, i.e., disposable diapers.

BACKGROUND OF THE INVENTION

Environmental issues have, in the past twenty years, evolved in importance. Environmental issues that were once sideline issues are now at the forefront of public thought and policy. Especially important are issues related to disposal of waste and the rapidly dwindling available landfill space. An ever-increasing population and the concomitant increase in consumer waste production, coupled with ever-dwindling landfill space, has fueled the search for alternatives to waste disposal methods.

One attractive way of reducing the amount of solid waste being disposed into the environment is the reclamation of reusable raw materials from disposable waste. Efforts to reclaim these raw materials have expanded recently to the point where they have become a profitable enterprise. The increased business incentive to recycle, and the public's perception that recycling works, and that it is not just a worthy cause but a necessary one, has driven the recycling industry to new heights.

The reclamation of single-use human waste collecting and/or absorbing products (disposable diapers) is one way of reducing the amount of solid waste being "dumped" into the environment. Disposable diapers currently take up approximately 2-3 percent of landfill volume. Moreover, human biological waste from disposable diapers is a potentially virulent contaminant of underwater aquifers and rivers. Awareness of the eventual health hazards and the increasing concern for the environment has generated a desire to do away with the accepted practice of using a diaper once and throwing it away.

In the past, before disposable diapers became popular, reusable cloth diapers were commonly used. Cloth diapers were washed and reused to ensure that the waste products ended up in a sewage treatment plant to substantially neutralize any harmful bio-organisms. However, the sheer numbers of diapers used during an infant's development made washing them a distasteful task. In addition, diaper covers or wraps used to fasten the diapers required washing. Also, the ends of cloth diapers were often affixed together with safety pins, which tend to be sharp and difficult to manipulate. Finally, cloth diapers were not as absorbent as disposable diapers which use special high-absorbent materials. The ease and convenience of disposable diapers has, therefore, become a more attractive alternative to cloth diapers. In fact, nearly 80-90% of all diapers currently used in America are disposable diapers.

The solution contemplated by the present invention provides the convenience of using disposable diapers with the environmental advantages of using reusable cloth diapers. Just as with bottles, cans, plastics and newspapers, curbside collection of soiled disposable diapers could be instituted to make the prospect of recycling such diapers minimally intrusive to consumers. However, the nature of the construction of disposable diapers makes their recycling problematic.

Disposable diapers are generally comprised of an absorbent pulp-like filler material made of wood or corn, with super-absorbent gel-like chemical beads called acrelites interspersed throughout. The pulp is held in place within the diaper by an outer plastic liner, and an inner plastic liner. Various adhesives are also used to join the plastics together. Plastic tabs are used to facilitate taping of the diaper onto the infant. The current difficulty in recycling soiled disposable diapers is that the diaper materials must be separated and cleaned before the raw materials can be utilized. Separation of the raw materials is required because only the separate raw materials can be sold and utilized properly. Unfortunately, means for efficiently separating the various materials which make up a disposable diaper are not well-known, and currently only a few attempts have been made to provide such technology.

Previously, methods for separating paper and plastic from disposable diapers have been based on generating enough heat to destroy the bonding of the adhesives which bind the plastic materials. In U.S. Pat. No. 4,990,244, a process and apparatus for separating plastic and absorbent materials from diapers is shown in which the adhesives joining the layers of plastic together are dissolved by raising the temperature of the adhesives in hot water. The hot water acts to dissolve the adhesives to allow the plastic and absorbent material to be separated.

The inherent problem in this method is that it requires a supply of hot water which in turn requires energy to produce. In the recycling industry, profit margins are relatively low and additional expenses for heating and maintaining hot water to successfully break down the adhesives can be a significant financial burden. Moreover, the separation of the two main diaper components is dependent on the complete liquidization of the joining adhesives. This liquidization will occur only at a certain temperature which then must be sustained while the adhesives are being washed away. Any residual adhesive will disadvantageously hinder the complete separation of plastic and absorbent material and/or may remain as an unwanted residue on the by-products. Consequently, there is a need for a more effective and cost-efficient means for reclaiming the primary components from soiled diapers and the like.

Another inherent difficultly in recycling the raw material components of a disposable diaper is that the diapers must be washed, cleaned, and then dehydrated so that the raw materials can be properly packaged and sold. Though the washing process has not presented much difficulty, very little technology previously has been developed to remove the excess water and moisture from the pulp-like material once it has been washed. Consequently, there is a need for an efficient and cost-effective method of removing water, and consequently the excess weight, from the pulp-like material.

Additionally, due to the relatively slim profit margins generated by a typical recycling enterprise, a cost effective means for the overall recycling process for disposable diapers must be provided.

SUMMARY OF THE INVENTION

The present invention represents a substantially improved, disposable diaper recycling process, incorporating a means of separating the raw material components of the disposable diaper without requiring substantial heat which is costly to generate. The present invention utilizes a diaper shredding process which shreds the soiled disposable diaper and tears apart the component raw materials making up the diaper. The shredded disposable diapers are then placed into a large industrial-sized washer to wash, disinfect and chemically treat with safe chemicals the soiled and shredded pieces of the disposable diapers.

The present invention also incorporates an energy-saving process of reclaiming heat for use in cleaning the diaper materials. The invention contemplates having the system integrated with and retro-fitted to an existing laundry facility or the like, so that water heated for use in the existing facility may be utilized by the reclaiming process. Heated effluent discharge water from the existing facility, already heated and containing cleaning agents, may be recirculated for use in cleaning the disposable diapers. Also, fresh cold water used to wash the disposable diapers can be run through an internal pipe, located inside of a larger pipe, containing discharge effluent hot water from the existing facility. This arrangement provides a highly efficient method of heat transfer, since the water used in the washer is recycled from the existing facility or is heated by reclaiming existing heat, and therefore does not require its own energy source.

Once the diaper materials are disinfected and chemically treated, the plastics remain inside the washer and the remainder of the slurry-like material, containing water and the pulp material, is drained into a drain trough below. The drain trough advantageously has two gates, one with perforations and one without. The gate with the perforations allows excess water from the slurry-like material to be drained. The slurry is collected in the trough and is pumped into an overflow reservoir, from which it slides down an angled perforated screen. The screen allows excess water to drip downward, while leaving the pulp-like material on the screen. The pulp-like material then passes between two rollers, wringing out additional excess water from the pulp-like material. The excess water is then drained, while the pulp-like material is collected in a bin below.

Because the excess water removed from the slurry also contains some residue of pulp-like material, it is recycled back into the drain trough or the washer. The slurry is then pumped up to the overflow reservoir where the process of sifting out the pulp-like material is repeated until the water dripping through the screen is relatively free of the pulp-like material. The excess water at the end of the cycle is then drained and disposed for treatment at a sewage treatment plant. At the completion of the process, the plastics collected in the washer are bailed and packaged for sale and recycling. The pulp-like material in the collection bin is also bailed and sold for recycling.

The present invention is advantageous in that the raw material components of the disposable diaper are separated by physically tearing apart the materials comprising the disposable diaper. The principal problem with past attempts to reclaim disposable diapers is that they required heated water to dissolve the adhesives which join the raw materials together. In many cases, the water had to be heated to at least 150°-180° to dissolve the adhesives and to separate the various materials, which requires energy and in turn makes the process more costly.

The advantage of the present system is that the disposable diaper does not need to be heated to separate the materials. Because the raw materials are shredded into small pieces, the materials can be washed, sifted and separated efficiently without dissolving the adhesives. Shredding the materials into manageable small pieces also facilitates transporting, drying, and collecting the raw materials for recycling. The process of separation by heat without shredding is inefficient and more costly and does not provide the benefits discussed above.

Another advantage of the present invention is that the system can be retrofitted into an existing laundry facility. In fact, water from an existing laundry facility is ideal for use in washing, disinfecting and chemically treating the soiled baby diaper materials. As the water must only be heated in the present invention to a temperature varying between 80° to 120°, a separate water heater, which consumes a substantial amount of energy, is not necessarily needed to heat the water to the necessary temperature. Because special detergent additives can be used in the cleaning process, high temperatures are not required to obtain the same results.

DETAILED DESCRIPTION OF THE PREFERRED EMBODIMENT

Figure 1:
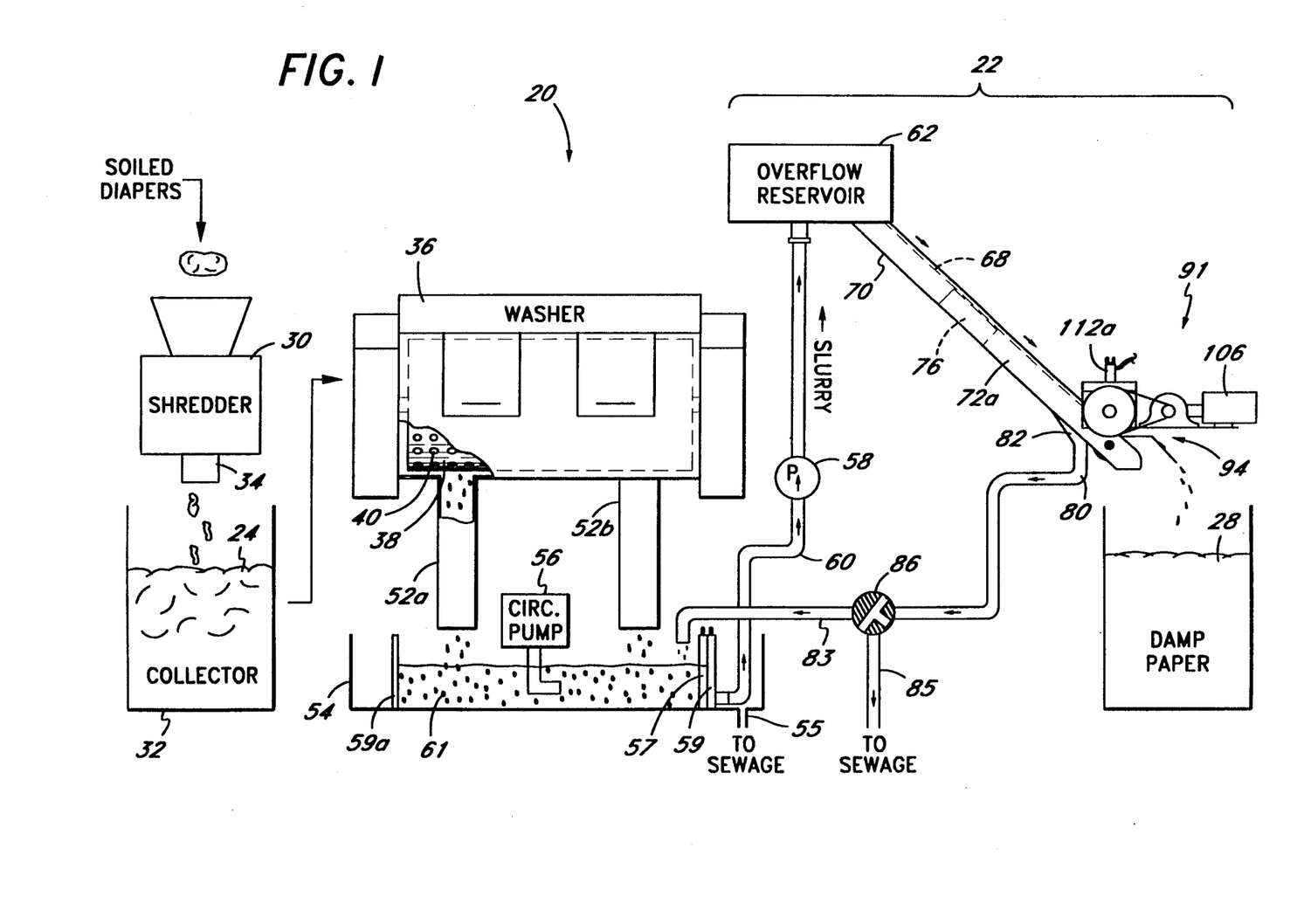
FIG. 1 is a schematic of the diaper recycling process of the present invention.

FIG. 1 is a schematic drawing showing the main elements of a diaper recycling system 20, and the flow of materials therethrough. The system 20 is comprised of a unique combination of standard, off-the-shelf, components, and also incorporates an apparatus for removing excess liquids from the pulp-like material, which will be described more fully below. The system can also be retrofitted into an existing laundry facility or the like, reducing the cost of installation and operation.

Initially, soiled diapers are fed into a shredder 30. The shredding device 30 of the present invention can consist of any industrial shredder existing in the marketplace, such as wood choppers or the like. Preferably, the shredding machine 30 can be obtained inexpensively as an off-the-shelf item. More preferably, the shredding machine 30 is a conventional tree branch mulcher of several manufacturers having sufficient size to shred bundles of soiled diapers without clogging or overheating. However, any industrial sized shredding device, used for shredding any material, can be utilized to shred the soiled diapers. Because the disposable diapers are not made of a tough material but rather are easily torn and shredded, almost any type of shredding device will suffice. The main requirement is that the shredding device 30 be made of a stainless, rust-proof material which can be easily cleaned with water and disinfectants. This is because the soiled disposable diapers are placed directly into the shredder 30 prior to the diapers being washed.

Most disposable diapers consist of a filler of absorbent pulp 28 made from wood or corn with super-absorbent chemical beads interspersed throughout, and three different kinds of plastic: an outer liner, an inner liner, and fixture tabs to facilitate holding the diaper on an infant. During the shredding operation, the outer and inner plastic liners are reduced to particles of a size preferably less than two-inches wide. The relative size of the particles can be greater or smaller depending on the size of the other equipment to be used, as discussed more fully later. The diaper materials can also be sliced, torn and/or rended open, thereby reducing the tensile strength of the plastic material and exposing the pulp-like material. Moreover, the agitation caused by the washing process, as will be discussed in more detail later, helps propagate the separation of any plastic materials remaining intact to release the pulp-like material within. Because of the shredding process, the destruction of the linings releases the pulp 28 and super-absorbent chemicals within, leaving them in particles and small clumps. The attachment tabs may or may not be reduced in size, and may or may not be separated from the particular plastic lining to which they are bonded. The resultant mulch 24 comprises all the various types of shredded plastic and loose pulp 28, as well as human waste.

It should be noted that the recycling process of the present invention can be used to reclaim other products of a similar nature, such as soiled paper or used napkins. The process advantageously reclaims virtually any used loose fibrous material, by shredding, cleaning and dehydrating the component materials. The advantage of the present invention is that even used products contaminated with waste can be properly treated for reuse. The product does not have to be relatively clean as in most paper recycling processes.

It is also worth noting that a disposable diaper collection system must be utilized for efficient transportation of soiled disposable diapers from the users' homes to the diaper reclaiming center. A collection procedure may be instituted in any community, in much the same fashion that bottles, cans, plastics and newspapers are collected. The soiled disposable diapers may be left in a plastic container along with the other recycling material on a weekly or bi-weekly basis.

The handling of the soiled diapers before and after the shredding step may be manual or, advantageously, be accomplished by robots, depending on economic factors Similarly, the movement of the diapers and component materials between the various steps of the process may be by hand or via some type of conveyor system. Preferably, initial reclaiming systems of the present invention will be incorporated within an existing commercial laundry. In this case, the trained labor is already in place and modifications to current structures and washing systems are minimal compared to constructing a completely new system.

Referring to FIG. 1, in the preferred embodiment, a wheeled collector 32 is disposed under an output chute 34 of the shredder 30. The diaper mulch 24 accumulates in the collector 32 until it is full and ready for transfer to the next stage of the recycling process. The transfer may be by hand or by an overhead hook and conveyor system commonly used in commercial laundries.

Figure 2:
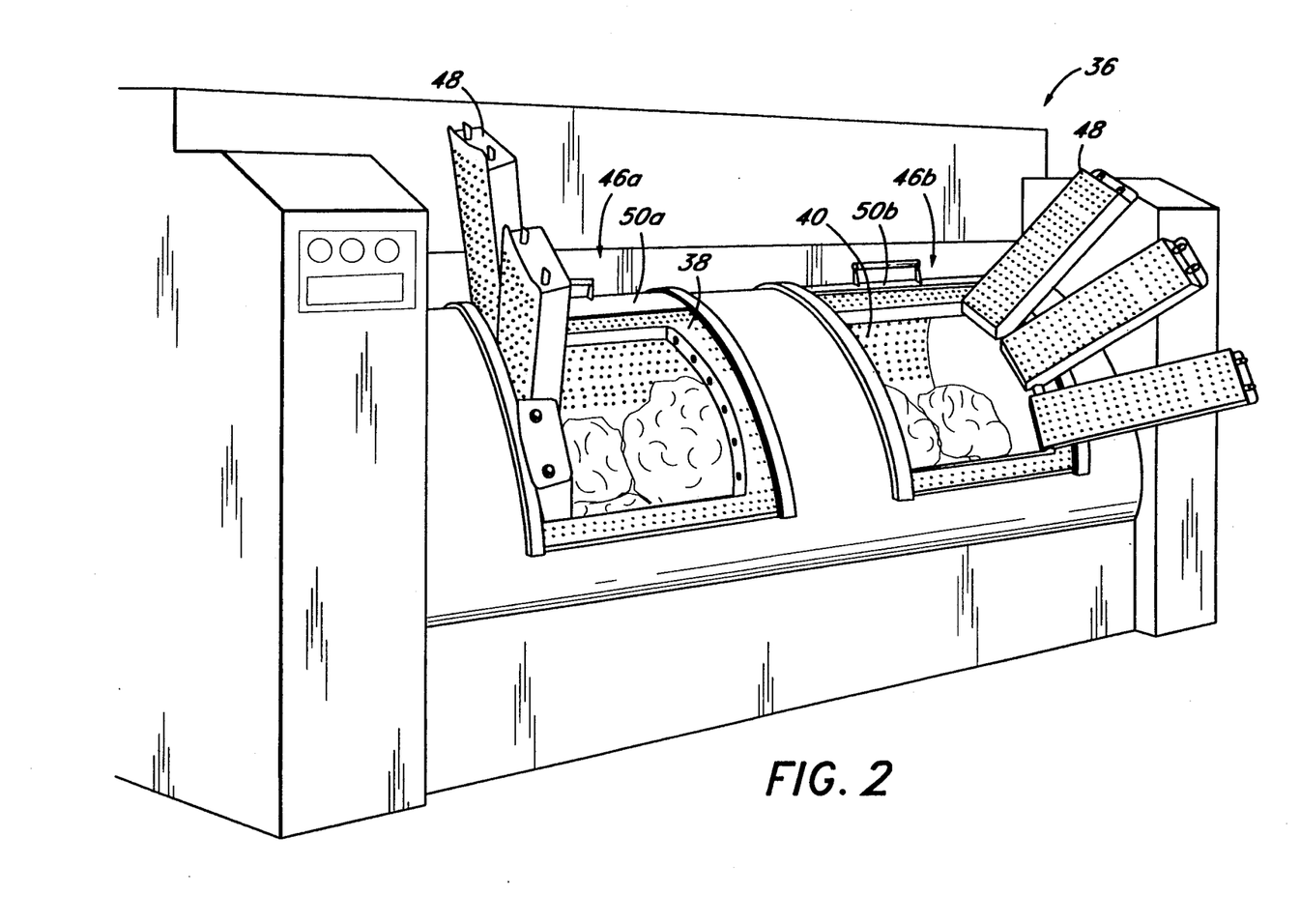
FIG. 2 is a perspective view of an industrial washing machine with the doors open revealing the perforated cylinder.
Figure 2A:
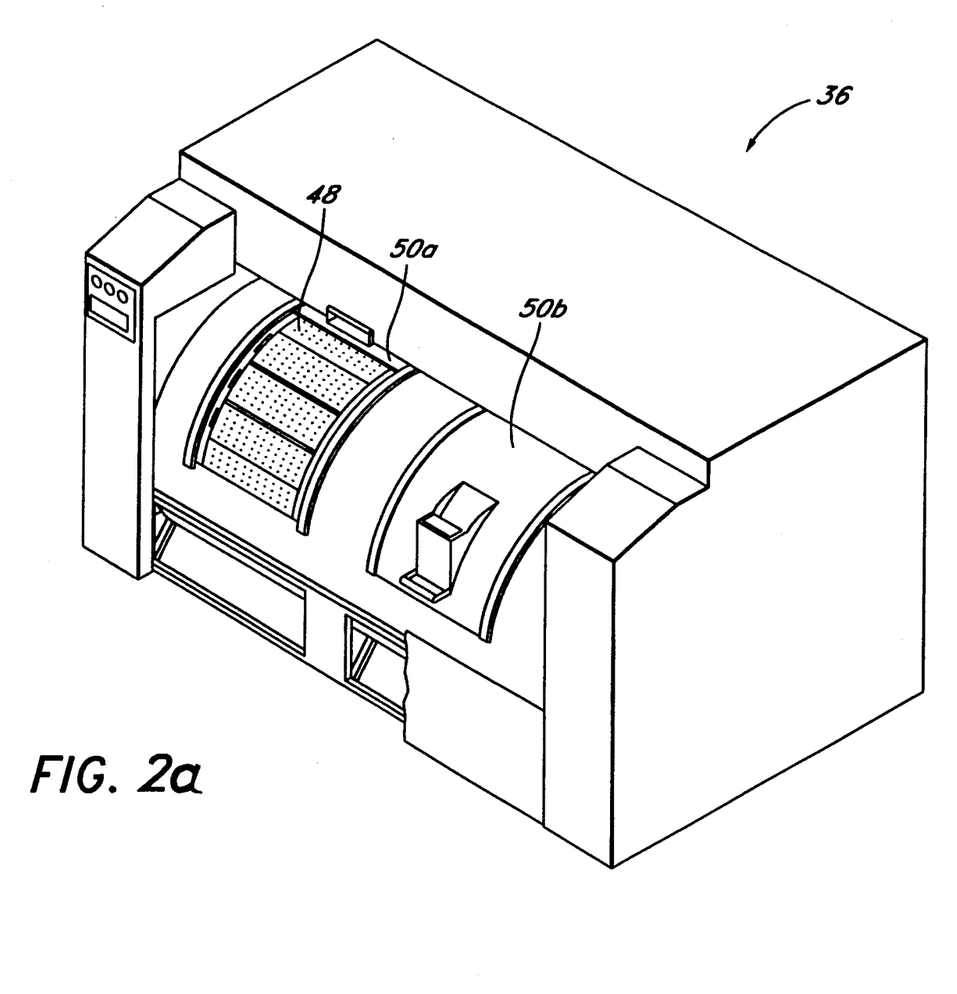
FIG. 2a is a perspective view of an industrial washing machine with the doors closed.

The soiled diaper mulch 24 is then deposited into a commercial-capacity washing machine 36, such as a Washex model manufactured by Floataire. Referring to FIGS. 2 and 2a, the washer 36 comprises a large perforated stainless steel cylinder or drum 38. The perforations 40 are advantageously sized to allow through passage of some solid material while providing a barrier to other, larger sized solid matter. Preferably, the perforations 40 are less than one-half inch in diameter. Longitudinal appendages integral with the inner wall of the cylinder 38, and extending radially inward, are provided for agitating the contents. The cylinder shaft (not shown) is mounted on bearings (not shown) at both ends and rotated by a motor (not shown). Two openings 46a,b at the upper front of the washer 36, of a size large enough for a worker to reach inside with both arms, allow access to the interior. A plurality of elongated rectangular shaped doors 48 cover each opening 46a,b and conform to the outer cylinder 38 wall when the washer 36 is in operation. The doors pivot outward for loading and unloading purposes, and are perforated in a similar manner as the majority of the cylinder 38. Arcuate solid sheet metal panels 50a,b cover and close the openings 46a,b, including the doors 48, to seal the washer 36 during operation.

The diaper materials are washed, disinfected and treated with effluent water or heat reclaimed water, as will be discussed in detail below. The washer 36 substantially cleans the soiled diaper mulch 24 with the help of several ecologically-safe chemical additives. Bleach is added to whiten the pulp filler portion and also to disinfect the mulch 24. Common detergent is used to create suds and break up the contaminants in the mulch 24. The bleaching agent selected should also act as a disinfectant to insure that the bacteria and contaminants are eliminated. Each of these products should be ecologically safe so that their disposal does not have an impact on the environment. Moreover, a salt and calcium chloride solution can be used for the purpose of breaking down the acrelites in the pulp-like material. Acrelites are a gel-like material in the form of pellets or beads which are dispersed in the pulp filler material and are activated when they are wetted to increase the absorbency of the pulp filler material. A salt and calcium chloride solution may be used to neutralize the acrelites so that they do not interfere with the separation process.

Figure 6:
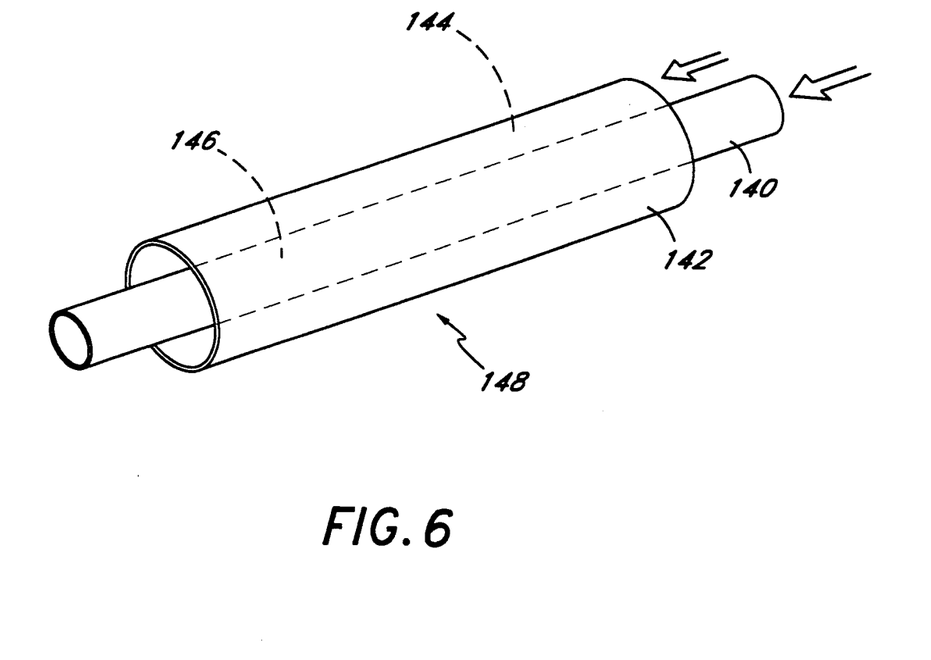
FIG. 6 is a cut-away perspective view of the heat exchanger with concentrically aligned pipes.

The preferred embodiment of the present invention incorporates a system for reclaiming already heated effluent water, and using heat from water previously heated for other purposes, i.e., an existing laundry process, to provide heat to the cleaning water. For instance, the heated effluent discharge water from an existing laundry process may be recycled and reused to clean the disposable diaper materials. Cold water 146 can also be heated by passsing the water through an internal pipe 140 located inside of a larger pipe 142 containing hot water 144 previously used for other purposes as can be seen in FIG. 6. A heat exchange apparatus 148, such as concentrically arranged pipes, transfers the heat from the waste water 144 to the clean water 146 to be input into the washer 36 of the recycling system 20. The heat, which would otherwise dissipate to the surrounding air, or lost down the sewer system, can be reclaimed. In essence, the preferred embodiment utilizes existing heat so that additional energy is not needed. With this heat re-use, cold city water can be heated free-of-charge to 80°-120°, as required by the recycling process wash cycle.

As stated above, the operation of the recycling process of the present invention is advantageously carried out simultaneously with conventional commercial laundry operations. The dirty effluent from these washers is traditionally drained down the sewer system, or filtered first to remove phosphides. The diaper recycling system 20 of the present invention, however, makes use of this dirty effluent water 144, which is already heated and contains cleaning detergent, for reuse in the washer. One major benefit of this feature is the availability of already heated discharge water and free energy to heat water for use in the washer 36 of the recycling system 20. Though many conventional laundries utilize wash water heated up to and over 180° F., water temperature not exceeding 120° F. is not only sufficient but preferred, due to safe low temperature detergents and additives, to adequately clean the disposable diaper materials.

Advantageously, the soiled diaper mulch 24 is separated into its individual components within the washer 36 even at this mild temperature. The pre-shredding of the diapers substantially frees the absorbent pulp 28 from the plastic liners without dissolving any of the adhesives. The adhesives in the diapers are mainly used to hold the plastic liners and tabs to each other. Some adhesives help hold the pulp 28 in position within the liners. However, only the pulp closest to the liners are bonded because of its loose fibrous nature. Upon shredding, agitation and submersion in warm water, the majority of the pulp 28 breaks up and floats free of the plastic. The small percentage of pulp 28 left bonded to the plastic by the adhesive is inconsequential considering the subsequent reuse of the plastic in products requiring less than pure raw material, as described below.

This washing and rinsing process separates the shredded plastic materials from the pulp-like materials. The plastic materials, which are larger than the perforations 40, remain inside the drum 38. The plastic materials are shredded preferably into pieces of approximately 2" in size and are not small enough to be forced through the perforations 40 in the drum 38 of the washer 36. Once the rinse cycle is complete, the plastic materials are retained inside the drum 38 of the washer 36, whereas the substantially liquified slurry 61 containing the pulp-like material is drained and collected in a drain trough 54 below.

It should be noted that the plastic material is collected in the washer drum 38, which may then be packaged and distributed to plastic recycling centers. The plastics collected in the washer drum 38, however, may not be pure, as bits of paper and residue of the pulp-like material may be left behind in the drum. Nevertheless, this material, which consists primarily of plastic, can be reused in various second-use applications requiring low grade plastics. Typically, the recycled plastic is finely shredded and pressed into beads, these beads being added to first-use plastics in amounts of up to 15% by weight. The applications for such material include garden furniture and accessories, coat hangers, video cassette bodies, office supplies and other general consumer oriented products.

In the rinse cycle, the centrifugal force within the rotating drum 38 of the washer 36 forces the slurry-type material containing the absorbent pulp-filler material to pass through the perforations 40 in the drum of the washer. The newly freed pulp material 28, with the water mixture, assumes the consistency of a slurry 61. This slurry material 61, consisting of water, wastes, disinfectants, cleaning agents, and the pulp-like material, is drained through large exit pipes 52a,b into the drain trough 54 located below the washer 36. The slurry material 61 is not completely clean, however, as the water and materials making up the slurry are drained from the washer 36 together.

Figure 5:
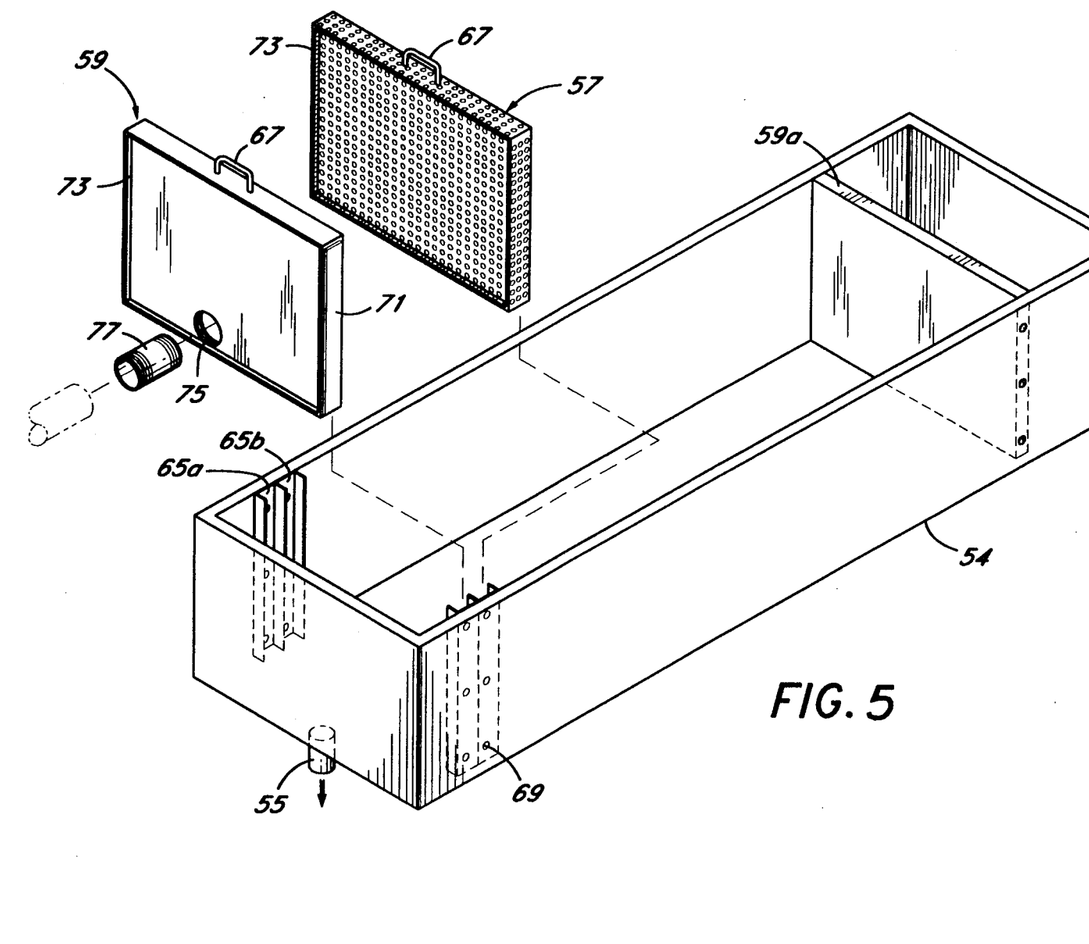
FIG. 5 is a perspective view of the washer drain trough and removable gates.

Referring now to FIGS. 1 and 5, the floor of the trough 54 is sloped or pitched so that the slurry 61 will run to one end where a sewage drain 55 is located. The trough 54 can be made of concrete or any stainless structural material, like stainless steel. Because of the fibrous content of the slurry 61, one or more circulating pumps 56 are disposed in the drain trough 54 to prevent any build-up and clogging under the exit pipes 52a,b resulting in a restricted flow out of the washer 36.

Advantageously, a gate system manages the effluent slurry flow within the drain trough 54, and removes a large quantity of water from the slurry prior to further dehydrating steps. The gate system comprises two types of stainless steel gates, one solid, and the other having perforations of approximately 1" diameter, in a staggered pattern, with approximately 1/16" between each perforation. These dimensions are only illustrative of the preferred embodiment, and any other dimension feasible for any conceivable use can be utilized. At least two stainless steel gates 57, 59 can be positioned in the drain trough 54, one with perforations and one without, to control the flow of the slurry material 61.

In the preferred embodiment, as best seen in FIG. 1, the gate system is positioned in the drain trough 54 between the sewage drain 55 located at the end of the trough and the area immediately underneath the washer 36. The gate system is utilized to control the flow between the discharge from the washer 36 and the sewage drain 55 located at the end of the trough 54. With only the perforated gate 57 in position, the slurry 61 collects in the trough 54 while excess water, containing a residue of contaminants and cleaning solutions, may pass through the gate and be disposed down the sewage drain 55, which is desirable during the initial discharge of effluent matter. The solid gate 59 can then be installed and the perforated gate 57 removed to permit the slurry 61 to collect within the drain trough 54. A separate transfer pump 58 can then remove the slurry and send it up through a piping network 60 to the upper end of the pulp dehydrating system 22.

The gate or gates 57, 59 are held in place within the drain trough 54 by two matching and opposite facing channels 65 bolted to the side of the drain trough. Each of these channels 65 are vertically aligned along the side of the trough 54, with the web of the channels directed perpendicular to the side. Holes 69 in the channels are countersunk so that the bolts (not shown) attaching the channel to the drain trough 54 will be flush. The channels 65 are positioned within the trough 54 in pairs facing each other such that each channel will support one side of a single gate. With the channels 65 in place, a gate, 57 or 59, can be positioned into the drain trough 54 by sliding the gate down between the two channels so that the gate fits snugly between the channels and the bottom of the trough. A neoprene-type seal 71 can be applied to the edges of the gate so that the gate slides easily along the inside of the channels, and so that the gate and channel comprise a sealed fit.

The gates 57, 59 themselves are in the shape of a pan having an outer flange 73 sized so that the gate will fit snugly within the width of the channel 65. For instance, if the channel 65 is two inches in width, the flange 73 on the gate 57, 59 should be slightly less than two inches so that the flange fits snugly within the channel but allows the gate to move freely down into position within the trough 54.

The gate system advantageously comprises a pair of two matching channels, one set of channels 65a for receiving the solid gate 59, and another set of channels 65b for receiving the perforated gate 57. The perforated gate 57 is advantageously positioned in front or upstream of the solid gate 59 in the preferred embodiment. Upstream refers to the direction away from the lowest part of the trough near the sewage drain 55 to the other side of the trough under the washer. In most operations, the perforated gate 57 will be utilized first to allow excess water to flow from the slurry-like discharge. After excess water is allowed to flow through the perforated gate 57, and it becomes desirable to have the pulp-like material collect within the trough 54, the solid gate 59 can be positioned adjacent the perforated gate 57 on the downstream side. Once the solid gate 59 is in place, the perforated gate 57 can be removed. Each of the gates 57, 59 preferably has a handle 67 positioned at the top so that the gates can be lifted into place.

In this system, the drain trough 54 may extend beneath a single washer 36, or a multiple number of washers. An elongated trough (not shown) may extend such that a multiple number of washers having exit pipes can drain into the trough. In the embodiment utilizing more than one washer with a drain trough extending underneath each of the washers, the gate system can be used to separate the trough into sections. For example, a gate system can be installed to separate the effluent discharge of one washer from the other washer. In addition to the gate system being positioned immediately adjacent the sewage drain 55, another gate system can be installed within the drain trough 54 between the locations where each of the washers discharge into the drain trough. In this manner, one washer can be operated to wash the shredded disposable diapers, and at the same time, another washer can be utilized for regular laundry purposes. The solid gate 59 can be positioned between the two discharges so that the slurry-like material can be collected into one side of the drain trough 54, while the other side of the drain trough can receive the effluent discharge from the normal laundry process, in which case the water can be drained directly from that side of the trough to the sewer line.

The solid gate 59 in the preferred embodiment also has a through-hole 75 near its bottom, of approximately 3-6 inches in diameter, disposed through the face of the gate and generally parallel to the longitudinal dimension of the trough 54. The through-hole 75 has a quick connect/disconnect threaded coupling 77 which allows either a hose or a plug (not shown) to be fastened thereto. With the plug in place, the solid gate 59 may be utilized as a solid barrier to allow the slurry to collect, in which case a pipe or flexible PVC can be inserted into the trough to pump the slurry to the dehydration area 22. A second solid gate 59a can also be permanently affixed to the trough 54 upstream from the washer exit pipes 52 to block the discharge so that it does not build up in an upstream direction distal from the sewage drain 55.

Without the plug, a hose can be placed directly onto the quick connect/disconnect coupling 77 so that material within the drain trough 54, such as the slurry material 61, can be pumped directly from the trough to another location. In use, once excess water is drained from the slurry material 61 through the perforated gate 57, and the solid gate 59 is positioned so that the slurry material collects in the trough 54, the slurry is pumped through the hole 75 in the solid gate and through a piping network 60 to the upper end of the pulp dehydrating system 22. It should be noted that a through-hole can also be placed in the perforated gate, which can be used in much the same manner as the solid gate 59, utilizing the hose to pump the slurry to the dehydrating system 22.

As seen in FIG. 1, the slurry 61 enters an overflow reservoir 62 through the bottom after being pumped from the drain trough 54. The slurry material 61 is allowed to collect in the overflow reservoir 62, whereupon the slurry flows over the front edge 64 and onto an inclined perforated screen 68. The perforated screen 68 is positioned at a downward angle of preferably approximately 45°-60° and allows the slurry material 61 to flow down by the force of gravity. The angle of the screen can vary, and in one embodiment, it can be adjusted, but the angle of incline is preferably at least 45° or more depending on the desired performance of the gravity flow on the screen. An agitating means 76, located underneath the screen, which shakes the screen to aid the movement of the slurry downward, can also be provided. The vibration of the screen 68 also aids in allowing excess water and other solutions to drip through the screen and onto an angled pan 70 located directly below and parallel to the angled screen. The excess water, containing the safe chemicals, bleaching agents and other remains, as well as some residual pulp-like material, which falls through the screen 68, is then drained from the bottom of the pan 70, and can be circulated into the drain trough 54. In another embodiment, the excess water can be distributed back to the washer 36 for reuse in the washing process. The excess water can also be drained to the sewer as will be discussed later.

Figure 3:
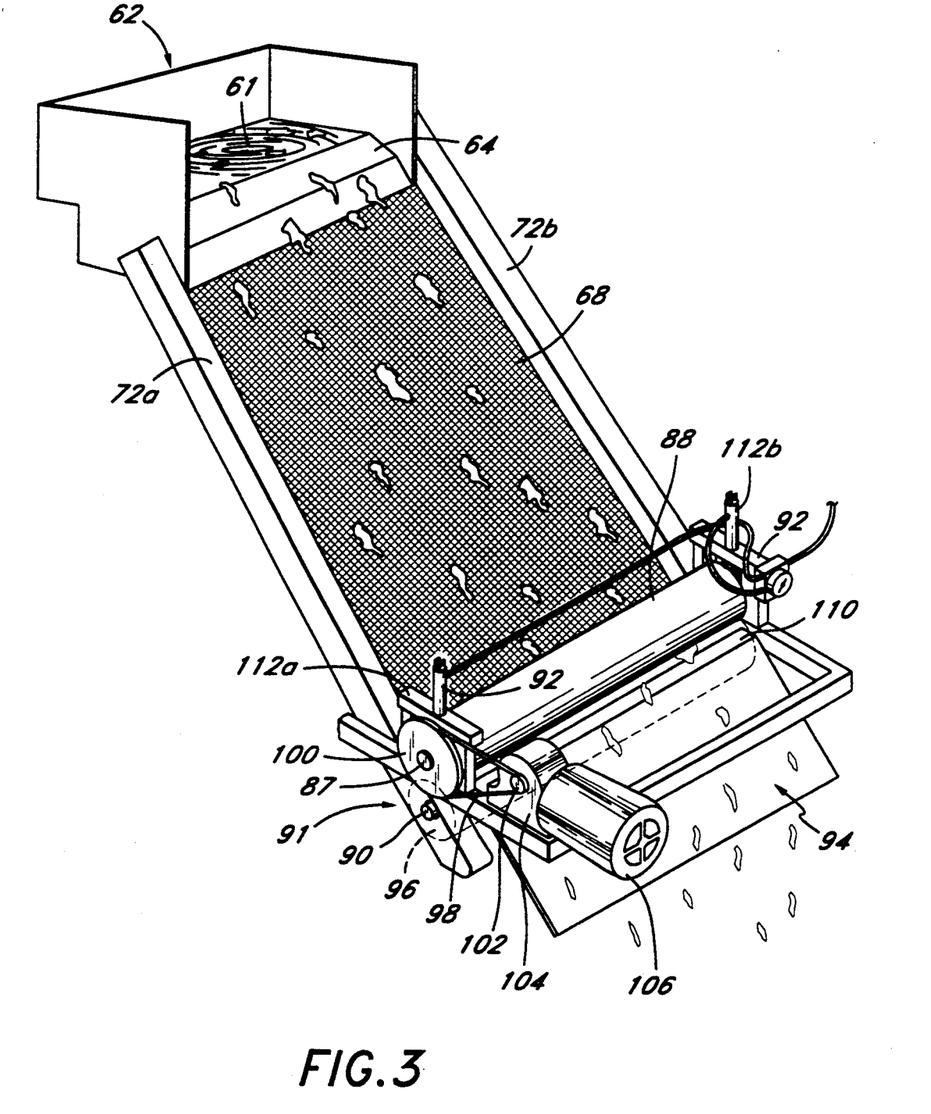
FIG. 3 is a perspective view of the inclined screen and roller apparatus with the overflow reservoir at the top.
Figure 4:
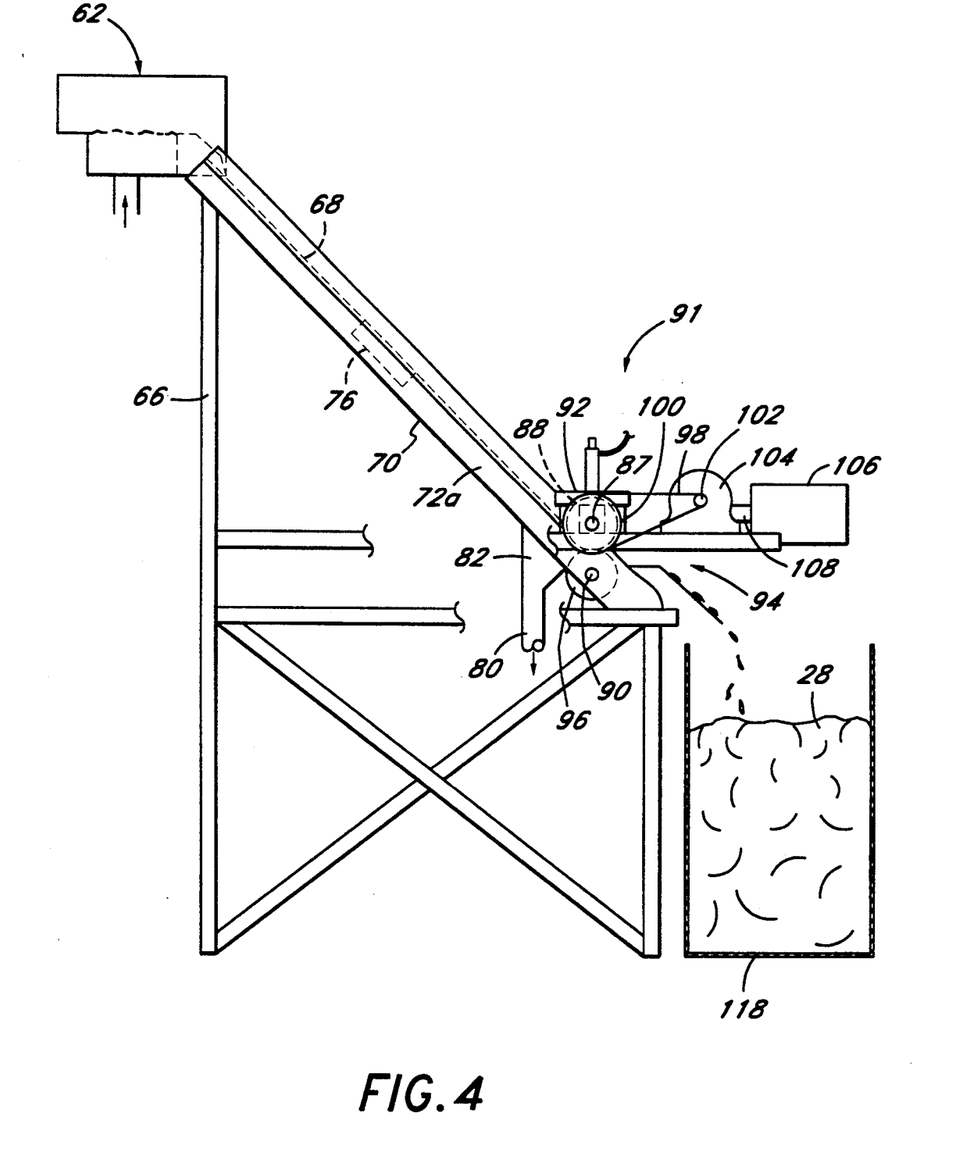
FIG. 4 a side view of the inclined screen and roller apparatus of FIG. 3.

Referring to FIGS. 3 and 4, the overflow reservoir 62 is simply a receptacle with the front edge 64 lower than the others so that the slurry 61 spills over the lower front edge when it reaches that level. An angle iron frame 66 supports the reservoir 62. The reservoir 62 is positioned with the top end of an inclined screen 68 butted up against and below the low front edge 64 of the reservoir. The screen 68 is supported on the sides by two parallel side structures 72a,b extending the length of the screen. The flat bottom pan 70 is located below and parallel to the screen 68 and has an outlet pipe 80 near the bottom. The screen 68 is loosely mounted between the side structures 72a,b consisting, for example, of angle irons, and the agitating means 76, such as a vibrator, is coupled with and shakes the screen 68. Due to the loose attachment of the screen to the structural frame 66, the majority of the vibrational energy transmits to the screen allowing the screen to facilitate the flow of slurry-like material down the angled screen without adversely stressing the frame. The base of the vibrator 76 mounts to the bottom pan 70 or side structures 72.

The pulp-like material 28 and wash water comprising the slurry 61 spills over the width of the low front edge 64 of the reservoir 62 and onto the screen 68. Gravity, along with continuous spillage and vibration from the vibrator 76, cause the slurry 61 to travel down the screen 68. As the slurry 61 descends, a majority of the water drains out through holes 78 in the screen 68, which are preferably 3/16" to ⅜" in diameter. This screen design maximizes the downward flow of pulp 28, while allowing a maximum amount of water to pass through the holes 78. The perforated screen 68 is advantageously made of a stainless material with perforations or openings that will allow excess water to drip therethrough, while maintaining the pulp-like fiber material on the top of the screen. The perforated screen 68 is relatively wide, approximately 2-8 feet wide, to allow a sufficient amount of slurry material to slide down the screen. The dimensions given, however, are not intended to be limitations, but rather merely indicate size parameters that may be used to achieve the intended results. The length of the perforated screen 68 can also vary from one to two times the width of the screen although the actual dimensions may be greater or less.

The lower end of the bottom pan 70 assumes a funnel shape 82. The outlet pipe 80 is connected to the funnel portion 82 and continues to a valve 86 which directs the flow to one of two pipes. In the first position, the valve 86 allows the water to flow through a pipe 83 back to the drain trough 54 under the washer 36. The pipe 83 can also be configured such that in the valve's first position, the excess water flows back to the washer 36 instead. In the second position, the valve 86 allows the water to flow through pipe 85 into the sewer system. Typically, the excess water of the slurry material 61 recirculates back through the dehydrating system 22 several times, via the valve 86 in the first position and pipe 83, until it is relatively free of pulp-like material. Then, the excess water is allowed to drain, via the valve 86 in the second position and pipe 85, into the sewer system. This repeated procedure helps substantially remove the pulp 28 from the final sewage effluent.

Another valve (not shown) can also be positioned on the pipe 83 directed to the drain trough 54 so that the excess water, in the valve's first position, flows to the drain trough, and, in the second position, flows to the washer. In this embodiment, additional pipes running to the washer and trough 54 can be installed.

All of the pipes and containers and structures of the present invention should be made of a material that will not readily corrode or rust. The drain trough 54 may be made of a stainless steel, cement or a plastic material and the pipes can be made of a PVC material. The overflow reservoir 62 and the screen 68, as well as the structural bracing 66, can also be made of a stainless steel material, or any other material that is relatively easy to clean and free of corrosion and rust.

The dehydration system 22 further passes the slurry and pulp-like material, which remains after sliding down the length of the screen 68, through a wringer apparatus 91 comprised of upper and lower rollers to squeeze out additional excess water remaining in the slurry material. In the preferred embodiment, the upper roller 88 is made of a rubber material and is relatively large enough to allow clumps of slurry-type material, consisting of the pulp-like filler, to be wrung under the top roller and between the two rollers. The bottom roller 96 is also made of rubber and is preferably larger than the top roller, but can also be made of a stainless steel material.

The bottom roller 96 is positioned adjacent the lower end of the screen 68 to allow the slurry material to flow between the two rollers. The clumps of pulp-like material, after having passed through the two rollers 88, 96, is relatively free of excess water and is scraped off of the bottom roller by an elongated horizontal blade 110 attached immediately downward from the rollers. The blade 110 is positioned so that the clumps of pulp-like material are scraped and freed from the bottom roller 96 and are allowed to fall and collect in a collection bin 118 located below.

The wringing apparatus 91 at the lower end of the inclined screen 68 squeezes most of the remaining water from the pulp 28. The elongated upper roller 88 rotatably attaches to a shaft 87, coupled to bearings (not shown) on a support frame 92, so that its axis of rotation is normal to the direction of pulp travel down the screen 68. The elongated lower roller 96 rotates on a shaft 90 coupled to bearings (also not shown) mounted to the support frame 92, or side members 72, so that its upper surface abuts the lower surface of the upper roller 88. The lower roller 96 is preferably larger than the upper roller 88, although actual dimensions may vary. Both the upper and lower rollers may be made of rubber or stainless steel. A drive chain 98, couples a drive gear 100, mounted concentrically on one end of the upper roller 88, and a pinion gear 102 on a transmission box 104. An electric motor 106 turns a shaft 108, which in turn rotates the pinion gear 102 and drive chain 98, thereby turning the drive gear 100 and upper roller 88. This drive train results in a low angular velocity with relatively high torque.

The contact surfaces of the two rollers 88, 96 move together at the same speed, the top roller rotating in one direction, which allows the slurry material to pass underneath, and the bottom roller rotating in the opposite direction, allowing the slurry material to pass over the bottom roller. However, only the top rubber roller 88 is connected directly to a drive chain; the bottom roller 96 is free to move, and does move due to friction from the upper roller during operation. The direction of rotation of the upper roller 88 is such that it pulls the pulp 28 between the two rollers 88, 96. Almost all the remaining water is squeezed out of the pulp 28 and falls through the screen 68 on the upward side of the rollers 88, 96. The excess water is then drained through the outlet pipe 80. The pulp-like material 28 passes between the two rollers 88, 96 to an exit area 94 on the downward Bide of the rollers. The elongated blade 110 scrapes away any pulp 28 sticking to the surface of the lower roller 96. The blade 110 is angled upward toward the lower roller 96 on the downward side. The angle of the blade 110 is such that it forms a ramp tangent to the lower roller 96 at the point of exit between the two rollers 88, 96.

An advantage of the present invention is that the top rubber roller 88 has a pneumatic press attached which allows the roller to move in a vertical or transverse direction with respect to the lower roller 96. This allows various size clumps of pulp-like material to pass through the two rollers 88, 96 without the pulp getting caught therein. The pneumatic press allows the top roller 88 to move slightly upward in the event a large clump of pulp-like material passes between the rollers. The pneumatic press can be loaded to approximately 100 psi to squeeze out excess water while retaining some freedom of movement in case of excessively large clumps of pulp-like material.

The press comprises two pneumatic cylinders 112a,b that provide a downward force on the upper roller 88, which is free to move vertically. The two cylinders 112a,b are disposed at both ends of the upper roller 88, and their pistons are mounted to the bearings which are rotatably coupled with the upper roller shaft 87 at each end. The exposed ends of the shaft 87 are guided by vertical slots (not shown) on the support frame 92 to allow only vertical translation. The cylinders 112a,b force the shaft 87 to a lower position until the bottom of the upper roller 88 contacts and is compressed against the top of the lower roller 96. The compression between the two rollers 88, 96 effectively wrings out a majority of the remaining water from the pulp 28, leaving the pulp only slightly damp and easy to bail and transport due to its reduced weight. Preferably, the downward force provided by the two cylinders 112a,b is light enough to allow the upper roller 88 to give slightly upwardly when larger clumps of pulp 28 enter the rollers 88, 96. This downward biasing of the upper roller 88 allows varying pulp 28 sizes to be consistently dehydrated.

The elongated blade 110 scrapes the dehydrated pulp 28, which tends to stick to the lower roller 96, and channels it down the exit area 94 to a collection bin 118. The collection bin 118 may have wheels for ease of transport or, alternatively, may be mounted on a conveyor means in a more automated embodiment. The collection bin 118 is transported to a pulp bailing area when full. The pulp 28 is gathered and pressed into 1200 lb bails for sale to customers of second-use pulp products.

Once the pulp-like material 28 scraped from the bottom roller 96 falls into the collection bin 118, the material can be bailed, distributed and sold for reuse to a repulping mill. The pulp-like material 28 is relatively clean in that the material has been chemically treated and excess water has been wrung out. Nevertheless, the pulp-like material 28 may contain a residue of chemicals and contaminants and may not be entirely clean. However, the pulp-like material can be sold in such manner as the repulping mill can have the pulp-like material cleaned, or may use it in applications not requiring pure material.

The process of wringing the pulp-like material continues until nearly all the pulp-like material is scraped off the bottom roller 96 and collected into the bin 118 below. In addition, the excess water wrung by the rollers 88, 96 and dripped from the screen 68 may contain some residual pulp-like material. Thus, the drain 80 which is located below the pan 70 is provided which recirculates the excess water.

The features of the present disposable diaper recycling system 20 make it highly economical to incorporate it within an existing commercial laundry facility, with a door-to-door pick-up system already in place, and an existing commercial washer and accompanying plumbing installed. The advantages over previous systems are numerous. Initially, the start-up costs, especially in conjunction with an existing commercial laundry, as mentioned above, are quite small. The shredding step allows the diaper plastic and pulp components to be separated within the washing machine 36 without the expensive addition of high-temperature water to liquidize the adhesives. The pulp 28 is in such a mulched state that it can be strained out of the washer 36 through the cylinder perforations 40, eliminating the need for an apparatus to mechanically sort pulp from plastic. The additional water dehydrating system 22 rapidly and effectively removes the majority of water, and disadvantageous weight, from the pulp material 28. The slurry 61 recirculation ensures that the bulk of the pulp 28 is extracted, increasing the system's yield, while decreasing the amount of solid waste sent to the sewage system.

In conclusion, the present invention embodies several marked improvements over disposable diaper recycling processes of the prior art.

I claim:

1. A process for reclaiming the component liner and absorbent filler materials of soiled single-use human waste collecting and/or absorbing products, comprising:

forming openings in said liner materials of said soiled single-use human waste collecting and/or absorbing products;

agitating said products in a water solution such that said openings in said liner materials are propagated and the absorbent filler materials inside are substantially released from said liner materials;

spinning said liner and absorbent filler materials in a container such that said liner materials are separated from said absorbent filler materials, said liner materials being retained in said container and said absorbent filler materials being substantially extracted along with said water solution; and removing excess water from said absorbent filler materials.

2. The process of claim 1, wherein the step of forming openings includes separating said products into pieces.

3. The process of claim 1, wherein the steps of forming openings comprises shredding said products.

4. The process of claim 3, including shredding said liner material into fragments whose dimensions range between 1 to 3 inches.

5. The process of claim 1, wherein the step of agitating said products includes washing said products in said container.

6. The process of claim 5, including forcing the absorbent filler material through small apertures in the rotating drum of said container, wherein said liner material is retained inside said container.

7. The process of claim 6, including washing said component materials in said container with water heated to a temperature between 80 to 100 degrees Fahrenheit.

8. The process of claim 7, including heating said water used to wash said component materials by running said water through an interior pipe, which runs through a larger external pipe, containing heated effluent discharge.

9. The process of claim 8, including draining the mixture containing said absorbent filler material from said container into a drain trough.

10. The process of claim 9, including removing excess water from said mixture by placing a perforated gate in said trough and allowing excess water to seep through said gate.

11. The process of claim 10, including pumping said mixture from said trough to an overflow reservoir.

12. The process of claim 11, including overflowing said mixture onto a screen, wherein said excess water containing said cleaning solution drips through said screen.

13. The process of claim 12, including wringing said mixture through a device comprised of an upper roller and a lower roller, wherein said mixture flows from said screen and between said rollers, removing said excess water from said mixture.

14. The process of claim 13, including permitting said upper roller to move in a direction transverse to said lower roller to allow large clumps of said absorbent filler material to pass between said rollers.

15. The process of claim 14, including draining said excess water down a drain with a valve, wherein said valve allows said excess water containing said cleaning solution to be circulated back to said trough.

16. The process of claim 15, including recycling said excess water through said process until said excess water is relatively free of said absorbent filler material, wherein said valve is turned to a second position, which allows said excess water containing said cleaning solution to be drained for sewage treatment.

17. A process for reclaiming the component liner and absorbent filler materials of soiled single-use human waste collecting and/or absorbing products, comprising:
   tearing said soiled single-use human waste collecting and/or absorbing products such that said liner materials are torn into chip-size pieces;
   agitating said products in a cleaning solution such that said absorbent filler materials are substantially released from said liner materials; and
   separating said liner materials from said absorbent filler materials in a rotating drum, such that said pieces of liner materials are retained in said drum and said absorbent filler materials are extracted along with said cleaning solution.

18. The process of claim 17, including the step of substantially withdrawing excess cleaning solution from said absorbent filler materials.

19. The process of claim 18, wherein said step of substantially withdrawing excess cleaning solution includes flowing said absorbent filler materials and said cleaning solution onto a perforated screen, such that said excess cleaning solution may pass through said screen, and be removed from said absorbent filler material.

20. The process of claim 19, wherein said perforated screen is angled downward to permit said absorbent filler materials to flow downward.

21. The process of claim 20, wherein said screen can be vibrated in order to facilitate the removal of excess cleaning solution from said absorbent filler material.

22. The process of claim 21, further including the step of withdrawing said excess cleaning solution from said absorbent filler material by passing said absorbent filler material between two rollers such that said absorbent filler material is substantially dehydrated.

23. The process of claim 17, wherein the step of tearing said products comprises shredding said products.

24. The process of claim 23, including shredding said liner material into fragments whose dimensions range between 1-3 inches.

25. The process of claim 17, wherein the step of agitating said products includes placing said products in a cleaning solution at a temperature between 80° to 120° F.

26. A method for reclaiming the component liner and absorbent filler materials from single-use human waste collecting and/or absorbing products, comprising:
   shredding said products such that the liner materials of said products are loosened from said absorbent filler materials;
   agitating said liner materials and said absorbent filler materials in a water solution to further loosen said absorbent filler materials from said liner materials;
   separating said absorbent filler materials from said liner materials by causing said materials to spin in a rotating drum, whereby said liner materials are retained in said drum and said absorbent filler materials are extracted with said water solution; and
   substantially withdrawing excess water from said absorbent filler materials so that said filler material may be packaged and reused.

27. The method of claim 26, wherein the step of substantially withdrawing excess water from said absorbent filler materials includes overflowing a mixture of said water and said absorbent filler materials from an upper container onto a perforated screen.

28. The method of claim 27, including the step of passing said mixture between two roller to substantially remove excess water from said absorbent filler material.

29. The method of claim 28, including the step of scraping said absorbent filler material from said rollers.

30. The method of claim 26, wherein the step of withdrawing excess water includes placing said filler material onto an angled screen having apertures of less than ⅛ inch diameter.

31. The method of claim 26, wherein the step of withdrawing excess water includes placing said filler material onto an angled screen which is made of stainless steel material.

* * * * *